Feb. 11, 1947. J. R. CAMPBELL ET AL 2,415,673
TURBINE CONTROL DEVICE
Filed Oct. 13, 1944

Inventors:
James R. Campbell,
Alfred G. Swenson,
by Harry E. Dunham
Their Attorney.

Patented Feb. 11, 1947

2,415,673

UNITED STATES PATENT OFFICE 2,415,673

TURBINE CONTROL DEVICE

James R. Campbell, Laguna Beach, and Alfred G. Swenson, Ontario, Calif., assignors to General Electric Company, a corporation of New York Application October 13, 1944, Serial No. 558,520

5 Claims. (Cl. 253—59)

This invention relates to a control device, more particularly to a control device for effecting a controlling action on a fluid responsively to a variable condition thereof, such as its temperature, and it has for its object the provision of an improved control device of this character.

More particularly, this invention relates to a control device of the character described and claimed in the copending application of James R. Campbell, Serial No. 492,295, filed June 25, 1943, and which application is assigned to the same assignee as the instant application. And it contemplates an improved organization of elements in a control device of this character.

Figure 1:
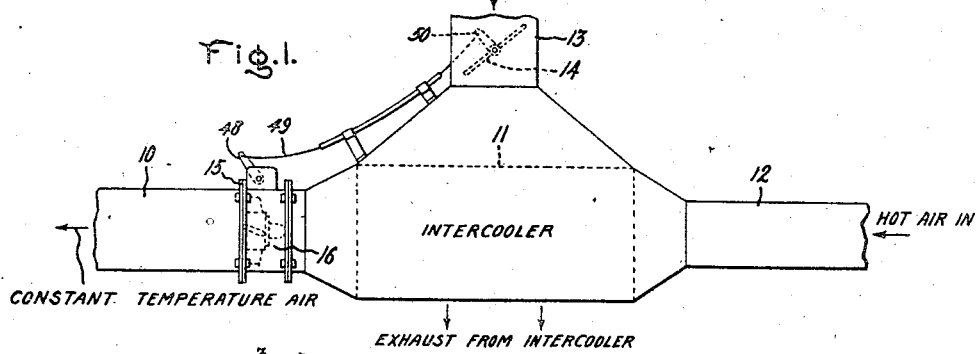
Figure 2:
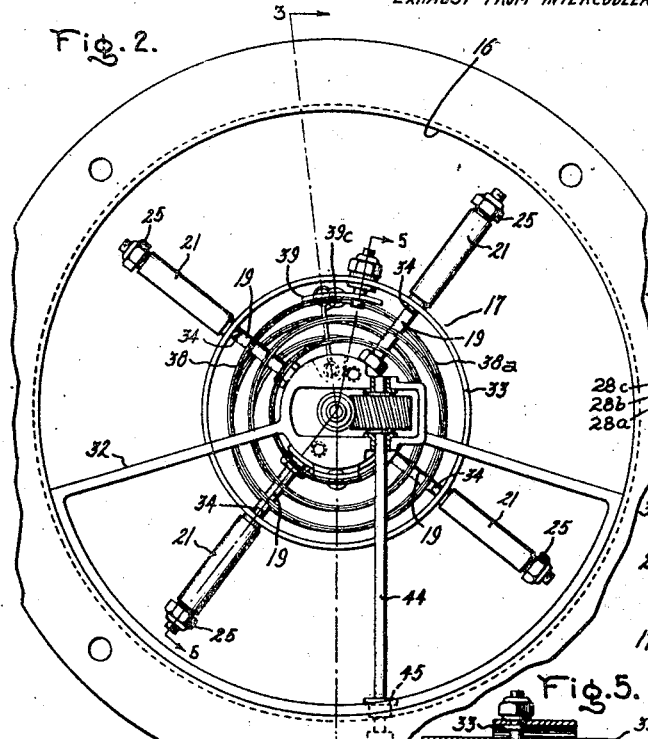
Figure 3:
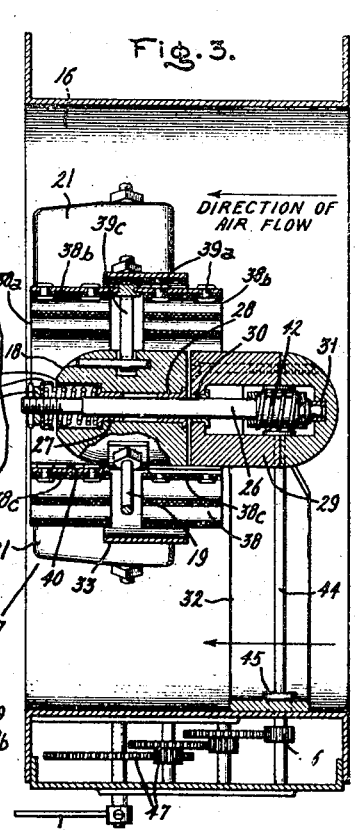
Figures 4, 5:
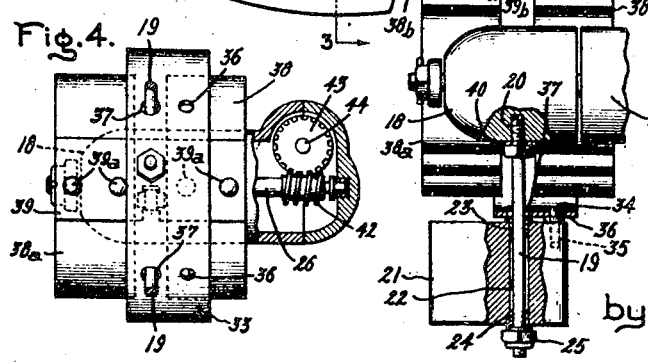

For a more complete understanding of this invention, reference should be had to the accompanying drawing in which Fig. 1 is a schematic drawing illustrating the control device of this invention as applied to control the temperature of the air flowing in a particular duct system; Fig. 2 is a front elevation of the control device arranged in accordance with this invention; Fig. 3 is a sectional view taken through the line 3—3 of Fig. 2 and looking in the direction of the arrows; Fig. 4 is a plan view of a portion of the apparatus shown in Figs. 2 and 3, parts being broken away so as to illustrate certain details of construction; and Fig. 5 is a sectional view taken through the line 5—5 of Fig. 2 and looking in the direction of the arrows.

Referring to the drawing, this invention has been shown as applied to the control of the temperature of the carburetor inlet air for an aircraft engine (not shown). As shown in Fig. 1, the heated air for the carburetor is delivered by a duct 10. The temperature of the air delivered into the duct 10 is regulated in an intercooler 11. Hot air is fed to the intercooler by means of a duct 12 from a suitable source of hot air supply, as from a compressor, or turbo-supercharger. The temperature of the hot air fed to the intercooler is regulated therein by cold air flowing from a duct 13 into the intercooler where it is brought into heat exchange relation with the hot air from duct 12. It will be understood that the temperature of the outgoing air to duct 10 will depend upon the amount of cold air fed to the intercooler and also upon the temperature of the hot air flowing into it from the duct 12. The cold air flow is adjusted by means of a control valve or shutter 14 which is controlled by our temperature responsive control device 15.

The control device 15 comprises a cylindrical duct-like housing member 16 which is adapted to be inserted into the duct system between the intercooler 11 and the carburetor feed duct 10, as shown in Fig. 1.

The temperature responsive control means comprises a turbine wheel 17. This turbine wheel comprises a hub 18 from which extend a plurality of circumferentially spaced radially extending shafts 19. The inner ends of these shafts are secured to the hub in any suitable manner; for example, they may be screwed into tapped holes 20 provided for them in the hub. Mounted upon the outer ends of these shafts 19 are impeller blades 21 which, as shown, are provided with bores 22 extending therethrough for the reception of the shafts 19; and which are journaled on suitable bearings 23 and 24 for rotary motion about the shafts, whereby the pitch of the blades may be varied. The blades are prevented from moving from the ends of the shafts by means of nuts 25. It will be observed that the blades are so mounted that the major portion of their areas extend "down-stream."

The hub 18 is rotatably mounted upon a suitable supporting shaft 26, the hub as shown being provided with spaced-apart bearings 27 and 28 for this purpose. While the hub 18 is rotatably mounted upon the shaft 26, it normally is caused to rotate with it by a clutch comprising a washer 28a secured to the shaft to rotate with it, and a cup 28b which is mounted on the shaft but which is not secured to rotate with it; the collar 28b, however, is firmly held against the washer 28a to effect a driving connection between the hub 18 and the shaft by means of a compression spring 28c mounted in a recess provided for it in the hub, as shown.

The shaft 26 is mounted for rotation in a suitable fixed support 29 in bearings 30 and 31. The support 29 is in the nature of a housing, as shown, and it in turn is mounted upon a suitable rigid framework 32.

The temperature control means further comprises means for rotating the blades 21 upon their shafts 19 so as to vary their pitch in order to control the speed of rotation of the turbine wheel 17 and also its direction of rotation in accordance with the temperature changes in the fluid flowing through the housing member 16. This means comprises a circular ring 33 between the hub 18 and the blades 21. The ring has its center substantially in the axis of rotation of the hub 18 and it has such a diameter that its outer surface lies directly under the bearings 24. The ring is interconnected with the blades 21 so that when the ring is rotated relative to the hub 18 it changes the pitch of the blades. This connection means comprises a plurality of pins 34 which are located eccentrically of the shafts 19 on the "up-stream" sides of these shafts. These pins, as shown, are received in circular bores 35 provided for them in the blades; and their inner ends extend through apertures 36 provided for them in the ring. It will be observed that if the ring be rotated relative to the hub 18, necessarily the pitch of the blades 21 will be changed. The ring 33 is provided with slots 37 through which the shafts 19 extend and which permit the relative rotative movement between the ring and hub.

The temperature control means further comprises a pair of helical temperature responsive members 38 and 38a which are interposed between the ring 33 and the hub 18 and housing 29. The outer ends 38b of these members are secured to the ring 33 by means of a plate 39 to which the ends are secured in any suitable way, as by rivets 39a, and a stud 39b fastened to ring 33 and passed through an opening provided for it in the plate 39. The plate 39 is supported by a rod 39c pivoted to the hub 18, as shown. The inner ends 38c of the two spiral elements 38 are riveted to a plate 40 which is secured to the hub 18.

While the temperature responsive elements 38 may have any suitable construction, we prefer to form them as bimetal elements; it will be understood that such an element comprises two metals rigidly secured together from end to end in any suitable way as by welding, and which metals have dissimilar temperature coefficients of expansion so that when they are heated or cooled they will cause rotating motion between opposite ends of the spirals, the direction and amount of rotation being a function of temperature. The two spirals are wound in opposite directions, with the high expanding side on the outside of one and on the inside of the other so that the ends of both spirals move in the same direction responsively to temperature changes. It will be evident that when the opposite ends of the spirals move relatively to each other, the spirals will rotate the ring 33 relatively to the hub 18 and hence will change the pitch of the blades 21 so as to control both the speed of the turbine wheel and its direction of rotation. Two spirals are used in order to eliminate the effects of centrifugal forces which would deflect the blades 21 if only one spiral were used.

The turbine wheel is mechanically connected to the shutter 14 so as to control its operation. For this purpose, the turbine wheel shaft 26 drives a worm 42 located within the housing 29 and which worm meshes with a worm wheel 43 also located within this housing; the wheel 43 is mounted upon one end of a shaft 44 having one end journaled in the housing 29 and at its other end in a bearing 45 mounted in the frame 32. The shaft 44 drives a spur gear 46 located outside of the housing 15 and which through a gear train 47 drives a crank 48. This crank operates the control shutter 14 through a push-pull cable 49 and a crank arm 50 connected to the shutter.

The clutch between the hub 18 and the shaft 26 comprising the washer 28a and the spring biased cup 28b is provided to prevent damage to the gearing just described in the event the gearing be stopped when the rotator is rotating rapidly. Under such conditions, the inertia of the revolving parts is dissipated in the clutch.

In the operation of the control device, it will be understood that if the air flowing into the duct 10 from the intercooler 11 be at the proper temperature, then the blades 21 will be set "down-stream" so that the turbine wheel 17 does not rotate. As long as this condition prevails, therefore, the shutter 14 will remain in a stationary position and the cooling air flowing through the intercooler will cool the hot air flowing into the intercooler from the duct 12 by just the proper amount.

However, if for some reason—such as a change in temperature in either the cooling air of duct 13 or the hot air of duct 12—the air flowing into the duct 10 should not have the proper temperature, then the turbine wheel 17 will rotate to change the position of the damper 14 to vary the amount of cooling air flowing into the intercooler so as to restore the temperature of duct 10 to the proper value.

Thus, if the air flowing ni the duct 10 should have a temperature which is too high, the thermal elements 38 will rotate so as to change the pitch of the blades 21 and thereby cause the turbine wheel 17 to rotate in a proper direction to open the shutter 14 and therefore permit more cooling air to flow through the intercooler in order to reduce the temperature of the air flowing in the duct 10. Conversely, if the air flowing in the duct 10 be too cool, the thermal elements 38 will turn the blades 21 in the opposite direction to cause the wheel 17 to rotate in the opposite direction in order to move the shutter 14 toward its closed position; this will shut down the flow of cooling air into the intercooler and therefore will permit hotter air to flow into the duct 10. In this way, the thermal responsive elements 38 control the shutter 14 in order to hold the desired temperature in the duct 10.

The turbine wheel 17 will operate the control means at a speed which depends upon the extent of the departure of the temperature from the correct value, the wheel rotating faster for great departures, and hence, restoring the temperature at a rate dependent upon the magnitude of departure.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

What we claim as new and desire to secure by Letters Patent of the United States is:

1. A temperature control device for a flowing fluid comprising a duct for conveying the fluid, a turbine wheel within said duct having a hub, a plurality of circumferentially spaced shafts extending radially from said hub and a plurality of blades mounted upon said shafts for rotary motion thereon, means within said duct rotatably supporting said hub, a ring around said hub having a diameter sufficiently large to leave an annular space between the ring and the hub, pins on said ring pivotally connecting it to said blades and positioned eccentrically to said shafts so that when the ring is rotated relative to said hub the pitch of said blades is changed, a bimetallic spiral in said space between said ring and said hub, and means connecting one end of said spiral with said ring and the other end thereof with said hub so that as the temperature of said fluid rises and falls said spiral rotates said ring in one direction or the other relative to said hub and by an amount proportional to the temperature variation.

2. A temperature control device for controlling a flowing fluid comprising, a turbine wheel having a plurality of spaced radially extending shafts, a plurality of blades journaled on said shafts respectively for adjustment of their positions on said shafts and thereby their pitch in order to control the speed and direction of rotation of said wheel, fluid flow directing means for directing the fluid through said blades for driving said wheel, a ring having its center approximately in the axis of rotation of said wheel and having such a diameter that its outer surface is adjacent the inner ends of said blades and also having a series of circumferentially spaced apertures through which said shafts extend, means pivotally connecting said ring with said blades at points eccentrically located with reference to said shafts so that when said ring is rotated with reference to said wheel said blades are shifted on said shafts in order to vary their pitch, said apertures in said ring having diameters sufficiently large to permit limited relative rotation between said ring and wheel, and temperature responsive means interconnecting said ring and wheel to control the rotation of said ring with reference to said wheel in accordance with temperature variations in said fluid.

3. A temperature control device for controlling a flowing fluid comprising, a turbine wheel having actuating blades thereon, means mounting said blades on said wheel for pivotal movement about predetermined axes for adjustment of their pitch to control both the speed and direction of rotation of said wheel, a pair of thermally responsive members on said wheel having spiral shapes with their axes substantially coincident and also being wound in opposite directions and arranged to coil and uncoil in the reverse sense in response to temperature changes in said fluid, whereby they move in the same direction responsively to said changes, all in order to counteract the effect of centrifugal forces acting on the spirals as said wheel rotates, and means connecting the outer ends of said thermally responsive members with said blades and their inner ends with said wheel so that the pitch of said blades is changed as said members coil and uncoil.

4. A temperature control device for a flowing fluid comprising a duct for conveying the fluid, a turbine wheel within said duct having a hub, a plurality of blades mounted on said hub for pivotal movement with reference to it about predetermined axes so that their pitch can be changed in order to control the speed and direction of rotation of said wheel, fluid flow directing means for directing the fluid through said blades, a ring having its center approximately in the axis of rotation of said wheel connected to said blades so that when the ring is rotated relative to said wheel said blades are rotated on their axes to adjust their pitch in order to control both the speed and the direction of rotation of said wheel, a pair of spirally wound thermostats mounted with their axes substantially coincident with each other and approximately with the axis of rotation of said hub, means connecting the outer ends of said thermostats with said ring and their inner ends with said hub, said thermostats being wound in opposite directions and also coiling and uncoiling in the reverse sense responsively to temperature changes so that their outer ends move in the same direction responsively to temperature changes, said thermostats thereby nullifying the effects of centrifugal forces on each other when said wheel is rotating.

5. A control device for controlling a flowing fluid comprising, a turbine wheel having actuating blades, means mounting said blades for movement about predetermined axes for adjustment of their pitch to control the speed and direction of rotation of said wheel, a member rotatable with said wheel mounted for movement with reference to the wheel, pivotal connection means between said member and said blades eccentric to said axes so that when the member is moved relative to said wheel said blades are rotated to adjust their pitch, a pair of spirally wound thermostats mounted with their axes substantially coincident with each other and approximately with the axis of rotation of said wheel, means connecting the outer ends of said thermostats with said member and the inner ends thereof with said wheel, said thermostats being wound in opposite directions and coiling and uncoiling in the reverse sense responsively to temperature changes so that their outer ends move in the same direction responsively to said temperature changes, said thermostats nullifying the effects of the centrifugal force on each other when said wheel is rotating.

JAMES R. CAMPBELL.
ALFRED G. SWENSON.

REFERENCES CITED

The following references are of record in the file of this patent:

UNITED STATES PATENTS

| Number | Name | Date |
|---|---|---|
| 1,782,073 | Piquerez | Nov. 18, 1930 |
| 1,858,566 | Terry | May 17, 1932 |
| 1,962,382 | Biggs | June 12, 1934 |